US009984549B2

(12) United States Patent
Poisner et al.

(10) Patent No.: US 9,984,549 B2
(45) Date of Patent: May 29, 2018

(54) NETWORKED SENSOR SYSTEMS AND METHODS

(71) Applicant: Intel Corporation, Santa Clara, CA (US)

(72) Inventors: David I. Poisner, Carmichael, CA (US); Yuri Krimon, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/968,319

(22) Filed: Dec. 14, 2015

(65) Prior Publication Data

US 2017/0169695 A1   Jun. 15, 2017

(51) Int. Cl.
| | |
|---|---|
| G08B 1/08 | (2006.01) |
| G08B 21/18 | (2006.01) |
| A63F 13/46 | (2014.01) |
| G06F 17/30 | (2006.01) |

(52) U.S. Cl.
CPC ............ G08B 21/182 (2013.01); A63F 13/46 (2014.09); G06F 17/30032 (2013.01); G06F 17/30368 (2013.01); G06F 17/30551 (2013.01)

(58) Field of Classification Search
None
See application file for complete search history.

(56) References Cited

U.S. PATENT DOCUMENTS

| | | | |
|---|---|---|---|
| 5,667,459 A * | 9/1997 | Su | A63B 71/0622 482/1 |
| 8,676,541 B2 | 3/2014 | Schrock | |
| 2007/0247306 A1 * | 10/2007 | Case, Jr. | A43B 3/0005 340/539.11 |
| 2008/0146329 A1 * | 6/2008 | Kodama | A63B 69/00 463/31 |
| 2009/0048044 A1 * | 2/2009 | Oleson | A63B 24/0062 473/570 |
| 2010/0035688 A1 * | 2/2010 | Picunko | A43B 3/0005 463/39 |
| 2010/0173276 A1 * | 7/2010 | Vasin | A63B 24/0006 434/307 R |

(Continued)

FOREIGN PATENT DOCUMENTS

WO    WO-2014194266 A1    12/2014

OTHER PUBLICATIONS

"International Application Serial No. PCT/US2016/061472, International Search Report dated Feb. 27, 2017", 3 pgs.

(Continued)

*Primary Examiner* — Thomas McCormack
(74) *Attorney, Agent, or Firm* — Schwegman Lundberg & Woessner, P.A.

(57) ABSTRACT

Embodiments of a system and methods for using a sensing attached to footwear are generally described herein. A device may include an accelerometer to measure a force, a transceiver to: send information about the force to an external device, and receive a response from the external device, the response indicating whether the force exceeded a threshold and occurred within a specified timing window around a sensory output. The device may include feedback hardware to generate feedback when the response indicates that the force fell below the threshold or occurred outside the specified timing window.

25 Claims, 8 Drawing Sheets

(56) References Cited

U.S. PATENT DOCUMENTS

| | | | |
|---|---|---|---|
| 2012/0116548 A1 | 5/2012 | Goree et al. | |
| 2013/0041617 A1* | 2/2013 | Pease | A43B 3/0005 |
| | | | 702/139 |
| 2014/0260677 A1* | 9/2014 | Dojan | G01L 1/2206 |
| | | | 73/862.045 |
| 2015/0151160 A1* | 6/2015 | Balakrishnan | G01P 13/00 |
| | | | 700/91 |
| 2015/0153374 A1 | 6/2015 | Balakrishnan et al. | |
| 2016/0180440 A1* | 6/2016 | DiBenedetto | G06F 19/34 |
| | | | 705/26.7 |

OTHER PUBLICATIONS

"International Application Serial No. PCT/US2016/061472, Written Opinion dated Feb. 27, 2017", 9 pgs.

* cited by examiner

NETWORKED SENSOR SYSTEMS AND METHODS

BACKGROUND

According to some technical analysts, there will be over 50 billion connected "things" by the year 2020. This will completely transform current infrastructures and will drive new innovations in industry, products, and services. Internet-of-Things (IoT) is term that represents devices and systems that communicate over a network, such as the internet. The devices and systems may include sensors.

Shoes equipped with sensors are increasingly common. They are used to track athletic activities such as running, to track the elderly, for navigation and to help the vision-impaired to move through their environment. Some such shoes include a processor used to communicate with other devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods are described herein for using footwear-based sensors for interactive games, crowd participation, and music playing. A basic technical problem involved in using footwear-based sensors for these activities is determining whether force exerted at the footwear is sufficient to trigger an event. A sensor may measure the exerted force. Another technical problem includes determining whether certain parameters were met using footwear at specific times.

In an example, an accelerometer may be used as a sensor in footwear for various purposes. For example, interactive games may be played using the accelerometer. The use of a footwear-based accelerometer provides significant advantages over other methods, such as using a camera. The accelerometer preserves privacy (i.e., it does not take pictures of minors or people that have not consented to having their photos taken). The accelerometer may work with greater precision (determining the exact timing of the movement) and with significantly less computing power than a camera-based approach. The accelerometer may work where a camera may not be viable, such as in a densely packed or dimly lit room where the camera may not be able to view a user's feet, such as at a party. The accelerometer may function better than a camera on a large dance floor, outdoors, or situations where users would not have or be able to maintain line-of-sight to a camera.

Figure 1:
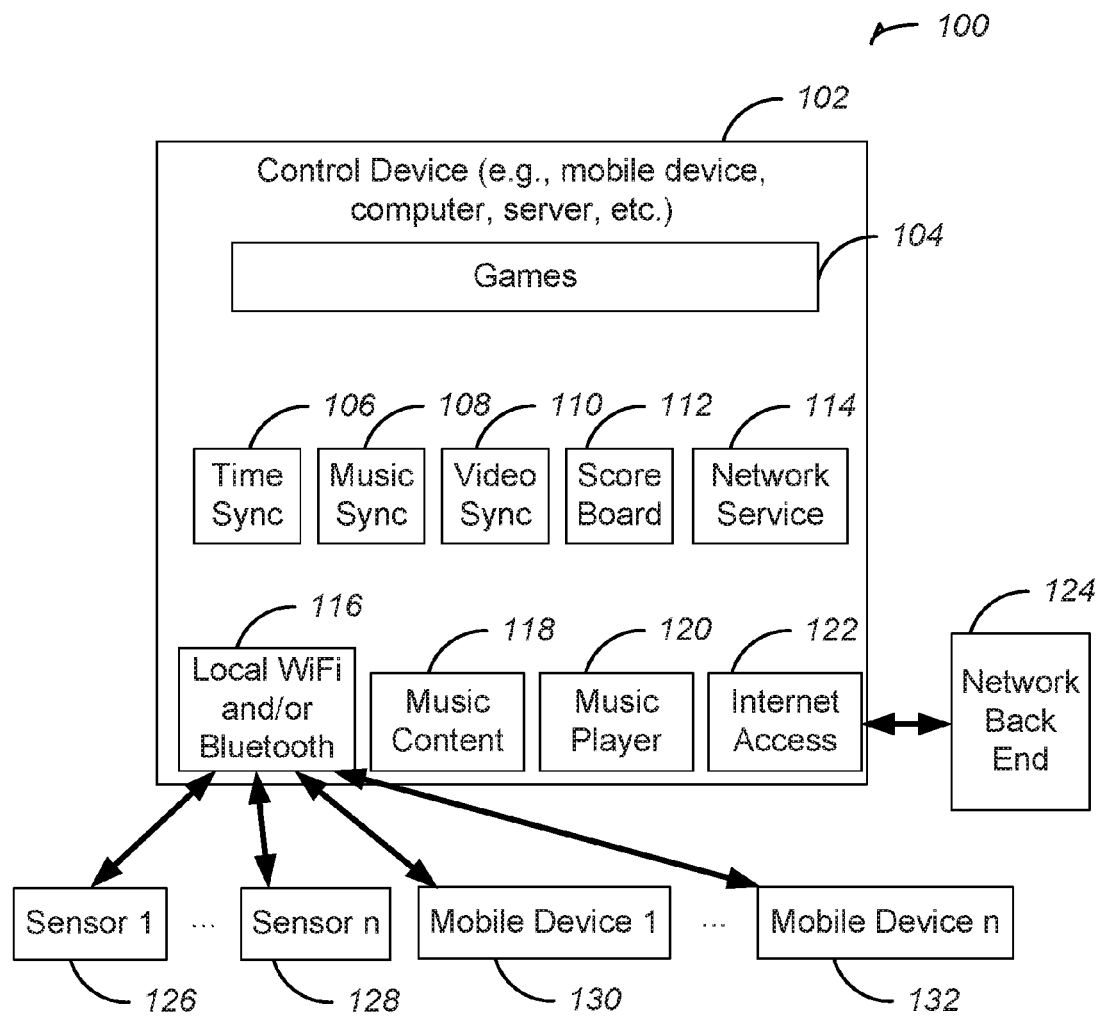
FIG. 1 illustrates a system for comparing sensor information and sensory output to evaluate timing or motion in accordance with some embodiments.

FIG. 1 illustrates a system 100 for comparing sensor information and sensory output to evaluate timing or motion in accordance with some embodiments. The system 100 includes a control device 102, such as a mobile device, computer, server, etc. The control device 102 may be remote or local to the sensors. Although FIG. 1 shows various components as part of control device 102, other configurations may be used with separate components. The control device 102 may run games 104, including processing optional elements of the games 104, such as time synchronization 106, music synchronization 108, video synchronization 110, a score board 112 or user scores, and a network service 114. The control device 102 may include a local wireless transceiver 116, to connect to various external devices and sensors. The local wireless transceiver 116 may use Bluetooth or WiFi (e.g., operating in an Institute of Electrical and Electronics Engineers (IEEE) 802.11 network) to communicate. The control device 102 may include music content 118, a music player 120, video content, a video player, etc. The control device 102 may be configured to have internet access 112 to connect with a network back end 124. The network back end 124 may store user scores, the score board 112, audio or visual content, or the like, such as for later use, repeat play, or to accumulate scores.

The system 100 includes one or more sensors, e.g., a first sensor 126, an nth sensor 128, etc. The system 100 may include one or more mobile devices, such as a first mobile device 130 an nth mobile device 132, etc. The system 100 may function with the one or more sensors 126, 128 in communication with the control device 102. In another example, a sensor 126 may communicate with a mobile device 130, the mobile device 130 acting as an intermediary between the sensor 126 and the control device 102 without the sensor 126 in direct contact with the control device 102. The communication may take place using wireless communication, such as using the wireless transceiver 116. In another example, the mobile device 130 may be the control device 102.

The system 100 may include sensors (e.g., 126 and 128) as an arrays. For example, a first sensor 126 may be attached to a user's left footwear and a second sensor may be attached to the user's right footwear. The sensor array may include an accelerometer or a set of accelerometers that measure 3-axes of movement or 3-axes of forces. The dual sensor array may allow for different uses for each sensor if the foot (left or right) is pre-identified. In another example, the foot (left or right) may be determined based on movement of the sensors. In yet another example, a sensor array may include a plurality of sensors attached to footwear of a plurality of users. In an example, sensor data from one sensor may be sent to another sensor, such as in a corresponding sensor on opposite footwear of a user (e.g., from left footwear sensor to right footwear sensor). The combined data may be sent to the control device 102.

The system may include an optional computing device (e.g., control device 102), such as a smartphone, tablet, notebook computer, or a computer directly connected to or built into a large LCD, a "smart TV," or a game system. The control device 102 may include storage (e.g., memory) or may use remote storage, or both, for storing sensor data. The games 104 may include a game application running on the control device that uses the sensor data as an integral part of the game. The control device 102 may include a processor to process the sensor data and assign a timestamp to the sensor data after it is received at the control device 102.

Figure 2:
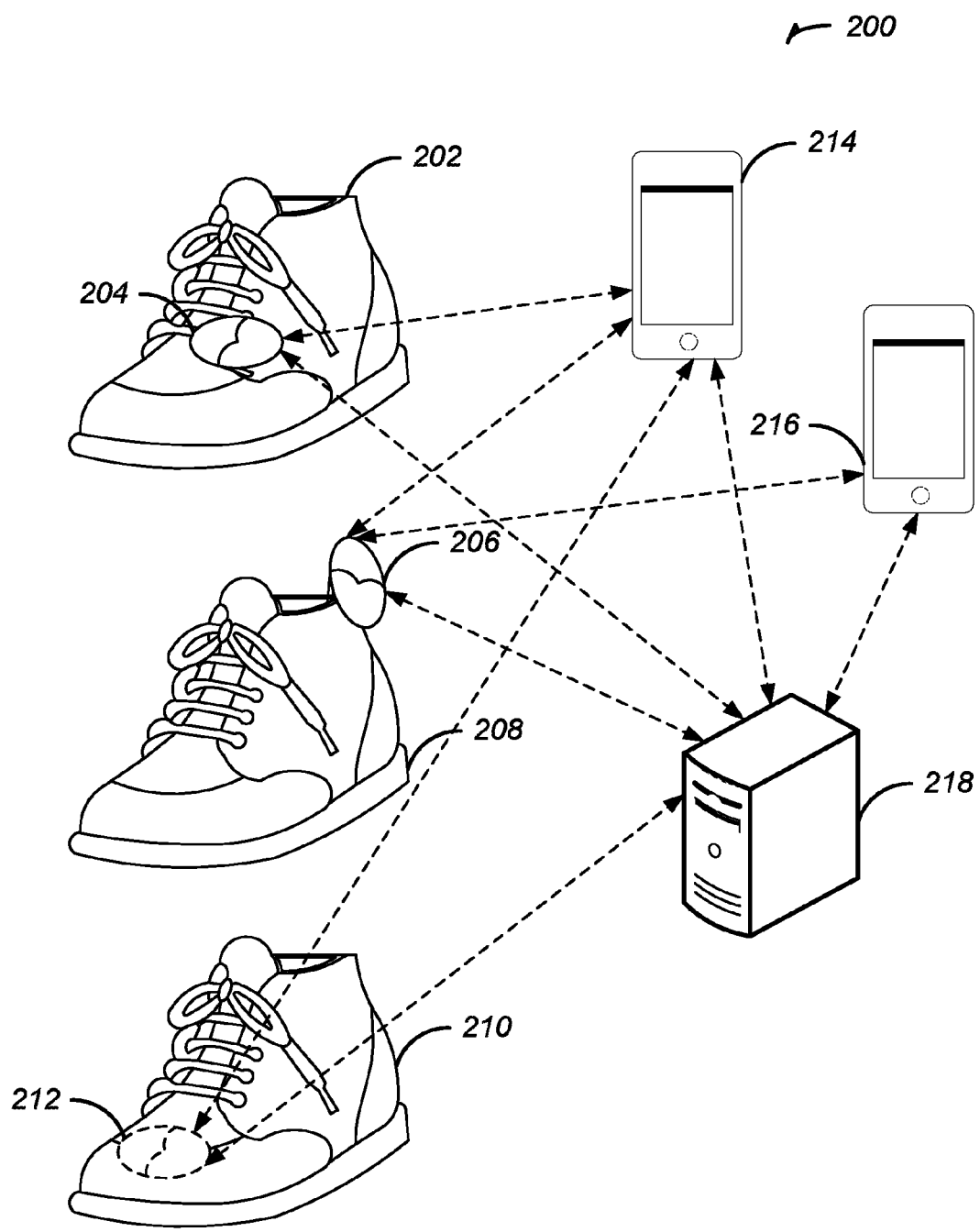
FIG. 2 illustrates a system including a sensor, footwear, a mobile device, and a computer/server in accordance with some embodiments.

FIG. 2 illustrates a system 200 including sensors, footwear, mobile devices, and a computer/server in accordance with some embodiments. The various components of system 200 are illustrative and may vary in number, size, shape, etc. For example, system 200 may include a single sensor or a plurality of sensors, a single mobile device or a plurality of mobile devices, etc. FIG. 2 shows system 200 with a first sensor 204 attached to first footwear 202, a second sensor 206 attached to second footwear 208, and a third sensor 212 embedded or built in to third footwear 210. System 200 illustratively includes a first mobile device 214, a second mobile device 216, and a computer 218.

In an example, the first sensor 204 may communicate with the computer 218 indirectly via the first mobile device 214 or with the computer 218 directly. The second sensor 206 may communicate with its own mobile device, such as the second mobile device 216, or may communicate with the first mobile device 214 as did the first sensor 204. Either the first or second mobile devices 214, 216 may communicate with the computer 218, or the sensor 206 may communicate directly with the computer 218. The third sensor 212 may similarly communicate with a mobile device or the computer 218 directly. In an example, a mobile device does not communicate with the computer 218, and instead performs the operations that would otherwise be done by the computer 218 (i.e., a mobile device or the computer 218 may act as the control device 102 of FIG. 1). A combination of these examples may be used by the system 200, such as using a single mobile device for all sensors or having a mobile device for each sensor.

The sensors in system 200 are shown attached to or embedded in the footwear. Other configurations may be used, such as attaching the sensors to laces, heal, toe, etc. in different places on the footwear. The embedded sensor may also be embedded in different places on the footwear. In another example, the sensor may be embedded in or attached to an ankle bracelet (i.e., anklet).

The communication paths shown in system 200 may change over time or with different uses of the sensors. For example, if a game or music or interactive activity is started on the first mobile device 214, it may control a single sensor or all nearby sensors. If the second mobile device 216 wants to join the activity, the second mobile device 216 may take over part of the sensor communication or may leave the sensor communication with the first mobile device 214. The second mobile device 216 may communicate directly with the first mobile device 214, such as by using Bluetooth, WiFi Direct, etc., or they may communicate through a communication node or through the computer 218.

Figure 3:
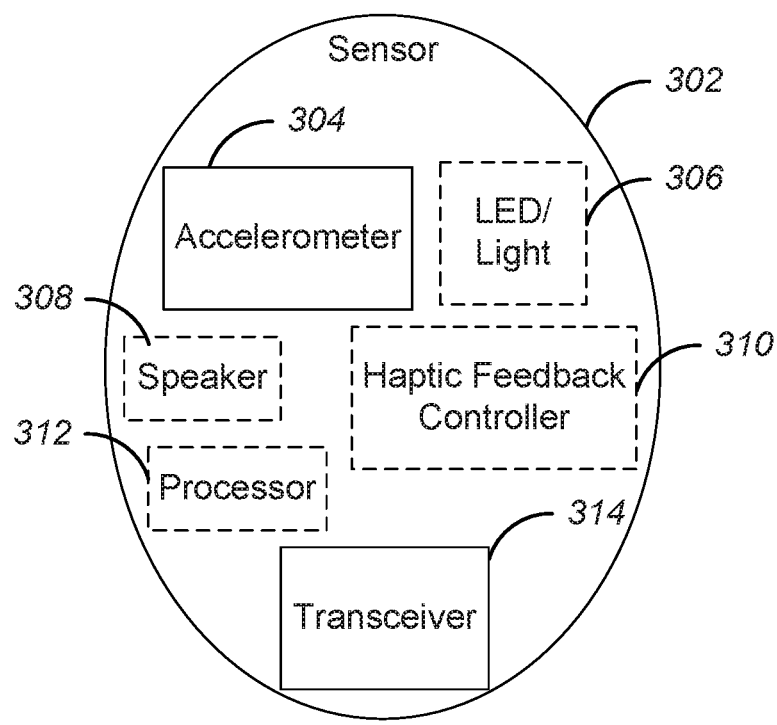
FIG. 3 illustrates generally a sensor for attaching to or integrating in, footwear or an ankle bracelet, in accordance with some embodiments.

FIG. 3 illustrates generally a sensor 302 for attaching to or integrating in, footwear or an ankle bracelet, in accordance with some embodiments. The sensor includes an accelerometer 304. In an example, the accelerometer 304 may be referred to as the sensor 302, without additional components. In this example, the sensor 302 may be housed in a sensor enclosure that may include the additional components. In FIG. 3, the sensor 302 includes a device with the accelerometer 304 as well as additional components, some of which may be optional.

Sensor 302 includes a transceiver 314 to communicate with a mobile device, computer, server, network, other sensors, etc. The transceiver 314 may send sensor data from the accelerometer 304 and may receive instructions for operating the additional components of the sensor 302. The sensor may optionally include an Light Emitting Diode (LED)/light 306, a speaker 308, a haptic feedback controller 310, or a processor 312. The processor 312 may be used to process instructions received from the transceiver 314. In another example, controls for the various components 306-310 may be hardwired into the sensor 302.

The accelerometer 304 may create sensor data based on a measured force exerted on the accelerometer 304. The transceiver 314 may send the sensor data to a control device, for example in a packet, message, transmission, control line, etc. The control device may assign a timestamp to the packet and determine whether the packet timestamp falls within a window. The window may correspond to an error range around a sensory output, such as a tone, music, visual output, haptic output, or the like. When the timestamp falls outside the window, the control device may send an indication back to the transceiver 314. The indication may be used by one or more of the LED/light 306, the speaker 308, or the haptic feedback controller 310 to alert the user of the sensor 302 that the action was not successful. In another example, the alert may occur in response to the timestamp falling within the window. In an example, the LED/light 306 may be used to display light feedback, the speaker 308 may play a tone or music, and the haptic feedback controller 310 may cause a vibration at the sensor 302.

Figure 4:
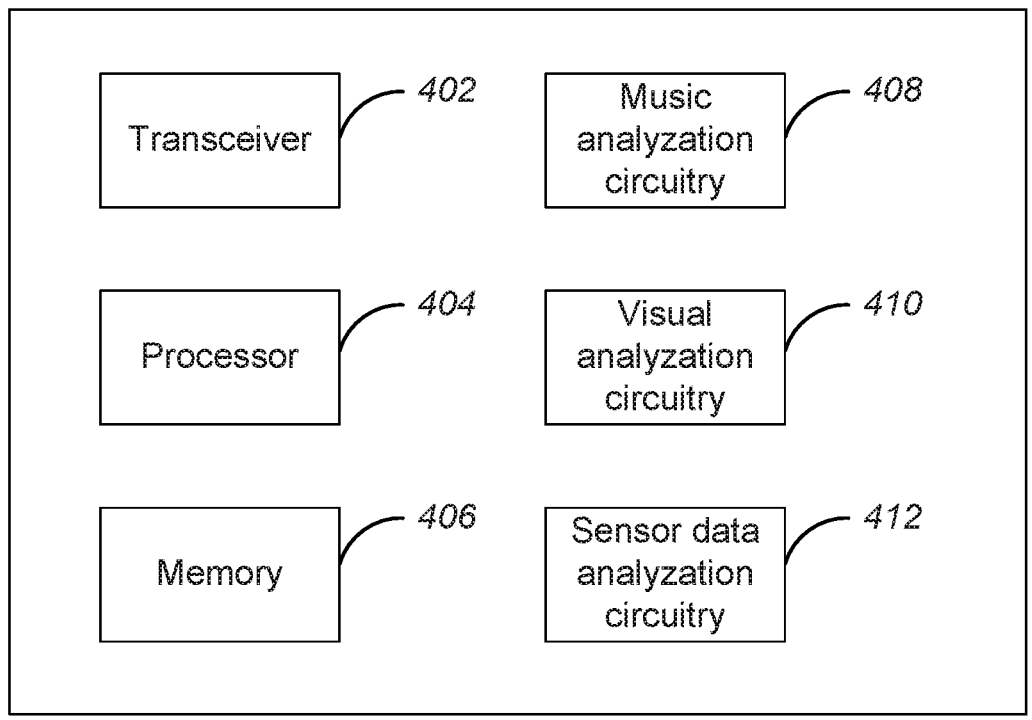
FIG. 4 illustrates generally a system for processing sensor data in accordance with some embodiments.

FIG. 4 illustrates generally a system 400 for processing sensor data in accordance with some embodiments. The system 400 includes a transceiver 402, a processor 404, and memory 406. The system 400 includes music analyzation circuitry 408, visual analyzation circuitry 410, and sensor data analyzation circuitry 412, any of which may include hardware, software, or a combination of hardware and software. The music analyzation circuitry 408, visual analyzation circuitry 410, and the sensor data analyzation circuitry 412 may be included in the memory 406, operated by the processor 404, and the results may be sent to another device or to a sensor using the transceiver 402.

In an example, system 400 includes a control device, such as control device 102 of FIG. 1. The transceiver 402 may communicate with a sensor (e.g., sensors 126, 128, or 302 of FIGS. 1 and 3). The transceiver 402 may receive a packet from a sensor and assign a timestamp to the packet when the packet is received. The processor 404 may determine whether the packet falls within a window, such as a predefined window or a window corresponding to an error range around a sensory output. The sensory output may or may not be originated by system 400. For example, the music analyzation circuitry 408 may receive and interpret music being played to determine a time when certain notes or beats occur. The music analyzation circuitry 408 may determine times using audio clues, techniques relying on spectrogram analysis, or the like. After the music analyzation circuitry 408 determines a time for a note or beat, the processor 404 may compare that (including using an error range such as 30 milliseconds for an adult user of a sensor or 100 milliseconds for a child user of a sensor or other programmable error ranges from a few milliseconds to a second or more) to the timestamp for the packet to determine whether the timestamp falls within the window. Similarly, the visual analyzation circuitry 410 may determine, from a visual cue such as a flash, visual event, or the like, a time for the visual cue and the processor 404 may determine if the packet falls within the window using the time for the visual cue.

Data from the packet received by the transceiver 402 may be forwarded to the sensor data analyzation circuitry 412. The sensor data analyzation circuitry 412 may interpret the data from the packet to determine other information from the sensor, such as a force applied at the time corresponding to the timestamp, or an orientation of the sensor, or the like. The sensor data analyzation circuitry 412 may use past data to determine a trend, such as an increase or decrease in force or movement, or a trend indicating that the sensor has remained stationary or substantially stationary for a period of time. The processor 404 may use data from the sensor data analyzation circuitry 412 to assign points or scores, track user movement, prepare music or video to play, or the like.

The system 400 may use the transceiver 402 and the sensor data analyzation circuitry 412 to determine time synchronization that allows for detecting the synchronization of two sensors on footwear of a user relative to each other. This also allows for games that involve measuring the motion of the footwear worn by two or more participants relative to each other. Determining time synchronization across multiple sensors may include examining the movement reported by each sensor and accounting for lag/latency in reporting.

The music analyzation circuitry 408 may allow for detecting the synchronization of one or more sensors relative to a music sound track. This allows for games that involve measuring the motion of the sensors relative to music, such as a game with one or more people dancing to a song. It also allows for games that involve advancing a music sound track based on participants moving the sensors.

The visual analyzation circuitry 410 allows for detecting the synchronization of one or more sensors relative to a video display. This allows for games that involve a user or users moving a sensor or sensors in response to a video display, such as a virtual soccer game.

Figure 5:
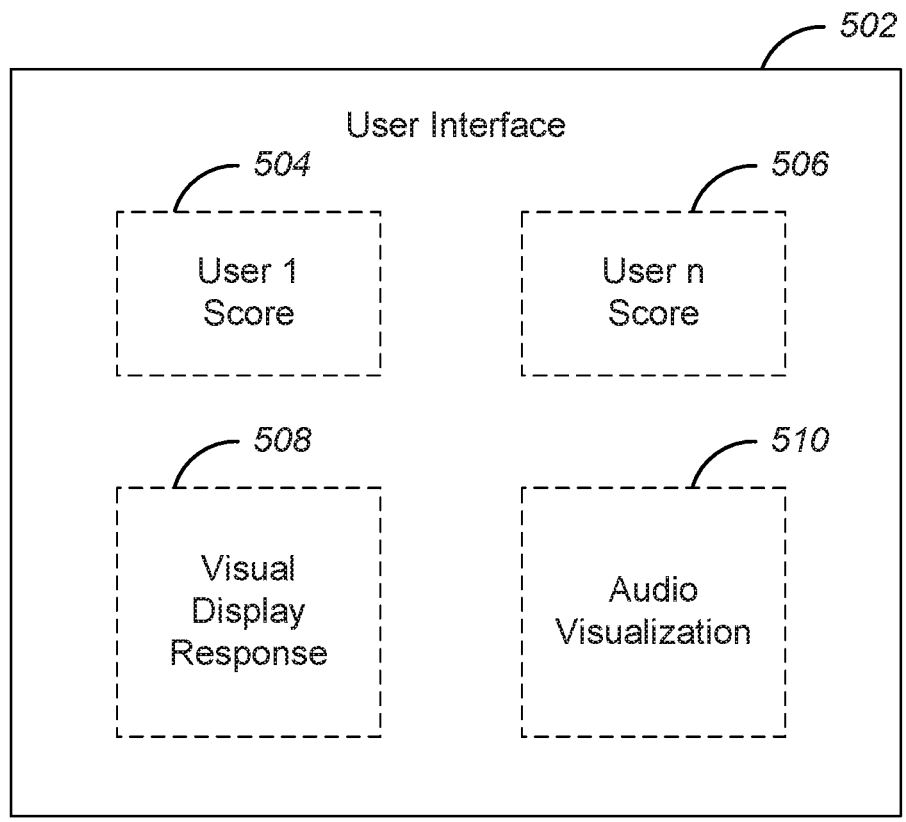
FIG. 5 illustrates generally a user interface for displaying a score representation of audio or visual responses to sensor data in accordance with some embodiments.

FIG. 5 illustrates generally a user interface 502 for displaying a score representation of audio or visual responses to sensor data in accordance with some embodiments. The user interface 502 may include user scores, such as a first user score 504, an nth user score 506, etc. The user interface 502 may include a visual display response 508 or an audio visualization 510. The user interface 502 may display rules, points, activities, users, or sensors for various games, described below. The user interface 502 may be displayed on a control device (e.g., control device 102), one or more mobile devices (e.g., mobile devices 130 or 132), a display coupled to the control device, or the like.

The user interface 502 may include a virtual scoreboard that allows for monitoring the results from multiple sensors and reports scores/results from individual and team events. The user interface 502 may be represented on a single large display or distributed to mobile devices. The virtual scoreboard may report results from various individual games. For example, the virtual scoreboard allows a DJ or event coordinator (e.g., a person) to select an individual game to set up. The virtual scoreboard may allow for display of results on a screen or for broadcast to mobile devices. The virtual scoreboard may show scores for individual events, cumulative scores, or golf-style handicaps. The system, control device, or user interface 502 may be connected to a back-end service. The back-end service may keep track of users' scores on various games, historical statistics, as well as handicaps. Handicaps allow players of different skill levels to compete together with more even outcomes.

A control device may include a game synchronization service to initiate games. The game synchronization service may auto start or stop a game based on the starting and stopping of a piece of music, a visual output, other sensory output, sensor movement, sensor force, or the like. For example, when a DJ starts a song, a game may auto start on the nth beat and auto stop on the last beat or when volume of the song goes below a prescribed level.

A first category of games may include games where the movement of one or more sensors attached to footwear of a user may be compared relative to music or used to activate music. The music may be played by a system and displayed using the audio visualization 510. For example, a game may include individual music synchronization. Music may be played from a source (e.g., from the game software running on a computer or from some generic music source). Each participant dances to some music and a control device analyzes the "beat" from the music and determines which participant is tapping footwear closest to the beat (using sensor data). A score may be reported for each participant and displayed on the user interface 502.

In another example, a team synchronization game may be played using two or more players grouped into one or more teams. The control device may play a musical sequence and the players tap or dance to the music. The control device determines how well the players on the team are synchronized in their tapping/movement using the sensor data. This game allows for competition between various teams or just reporting on the synchronization of a single team.

In yet another example, a music sequence may be repeated by using a control device to play a short sequence of beats. Players may then use their feet to tap out the same rhythm. For each turn, the control device increases the complexity or duration of the sequence. The control device then determines which players most closely met the beat and which did not and awards points that may be displayed on the user interface 502.

Another example includes using sensors in a virtual band. During set-up of this game, individual sensors on footwear from one or more participants are associated with a music track. For example, a music track might be an individual instrument (e.g., percussion, guitar, trumpet, etc.). When the control device receives a movement indication from a sensor, the control device causes the music for that track to be played (for example, one beat per tap of the sensor). If all or a majority of the sensors of the participants are moved together in the right synchronization, the music may be made to sound coordinated (e.g., played with all or the majority of instruments). If not, the music may be made to sound bad by desynchronizing the various instruments, not playing one or more instruments, or altering the tone of one or more instruments. In another example, foot movement of the members of the virtual band may control relative volumes of their respective musical instruments. For example, a trumpet controlled by a sensor or sensors of a first player may increase in sound when the first player dances or taps a foot with higher intensity, such as by measuring range and frequency of motion or force. The emphasis of this game may rely on movement over time rather than simply time or movement independently. For example, range, frequency, and trajectory of the physical motion of the foot may be a controlling element determined by the sensor Similarly, a musical instrument may fade when a corresponding player slows or stops moving or moves in an asynchronous manner.

In an example, the virtual band example above may be extended to a battle of the bands game. This example may use a similar setup as the virtual band, and use more than one band that plays consecutively (i.e., not at the same time). The control device may determine which band had the most accurate playing after each band plays a song or a set. The winning band or bands may be awarded points displayed on the user interface 502.

A second category of games may include games where the movement of one user's feet is directly compared, using sensor data, against an absolute time or distance or against movement of another player's feet using sensor data.

For example, a game in this category may include measuring a jump or kick. A control device may instruct a user to perform a particular physical maneuver, such as a jump or kick. The accelerometer in the sensor attached to the user's footwear may be used to record the movement and report to the control device. The control device then may determine the maximum time in air, maximum height of kick, etc. If more than one player is playing, the control device may report the scores or winners on the user interface 502.

In another example, a game in the second category may include a repeating game where a player must mimic actions by another player, a leader, etc. For example, a first player may tap a foot, and a second player must then repeat the tap. This game may be iterative, such as if the first player then does a kick, the second player must tap and then kick. Hand motions or other actions may also be incorporated using additional sensors, toys, or other games.

A third category of games may include games where the movement of one or more player's feet, as measured by sensors attached to footwear, may be used as a control input to some other aspect of a visually-oriented game. For these games, a player may use a display (e.g., a television), in front of a projected display (such as a liquid crystal display (LCD) projector), or an augmented reality or virtual reality displays.

For example, games in the third category may include a virtual kickball game or virtual soccer/football game. The control device may display a ball, either moving or stationary, and the user may attempt to virtually kick the ball. A sensor may send data to the control device, which may then determine based on the timing of the kick measured by the sensor whether contact was virtually "made" with the ball. The control device may also determine, using sensor data such as force exerted, how far to virtually move the ball based on the kick. A plurality of players may use a plurality of sensors to move a ball around for a soccer game using these techniques and a single display (e.g., user interface 502) or a plurality of displays (e.g., two or more displays remote from each other). In the virtual kickball game, a virtual representation of a player may be presented running bases after the kick, based on probabilities and direction of the kick causing the virtual ball to go a certain virtual distance. In an example, haptic feedback may cause the sensor to vibrate in response to a successful kick of a soccer or kick ball, such as to simulate a feeling on a foot of kicking a ball.

In another example, a virtual game may be played at a large gathering of people. For example, at a football or soccer/football stadium, a large number of fans attending the game may create a virtual game on the scoreboard (based on movement of sensors attached to their footwear). In another example, the fans may be watching the stadium remotely and may affect the virtual game on the scoreboard. In another example, both local and remote fans may affect the virtual game on the scoreboard. The scoreboard may be represented by the user interface 502. An example implementation may include using the average movement from fans in a first section to control one player, and the average movement from fans in a second section to control a second player, etc. In an example, this game could be played at half-time of a "real" game being played at the stadium.

In yet another game, a virtual pedal for a car racing game may be controlled using a sensor. For example, a control device may detect a foot position and use the position to determine pressure on a virtual pedal for a car. The car may be displayed on the user interface 502, controlled by the determined pressure. An optional haptic mechanism may provide a simulated feel of pressing a pedal. Virtualization of the pedal mechanism allows a user to play car driving video games without needing an additional physical peripheral device. In this game, a plurality of virtual pedals may be used to control a car. For example, a first virtual pedal may act as an accelerator, as second as a brake, and optionally, a third as a clutch. The various pedals may be controlled by different sensors, or may be dependent on motion of a single sensor (e.g., the sensor may determine that a user moves a right foot to the right to "step" on the virtual accelerator pedal and the right foot to the left to "step" on the virtual brake pedal). This example may use virtual pedals corresponding to physical space around the user to simulate a real car, such as by having a user control a clutch with a left foot and a brake and an accelerator with a right foot. In an example, haptic feedback may be used to provide a simulated feel of pedal resistance.

Other game examples in the third game category include a virtual skateboard game and a virtual hopscotch game. For the virtual skateboard example, a skateboard may be placed on a small stand that allows for small movement in 3 dimensions. For the virtual hopscotch example, each jump by a user may advance a virtual representation of the user through a virtual world on the user interface 502 (e.g., jumping over mountains, through a forest, etc.) using sensor data. For games in the third category, real-time haptic feedback may be provided to simulate the feel of real action (e.g., landing in hopscotch or hitting bumps in the road on a skateboard).

In yet another example, a sensor may be used for training, such as by using real-time haptic feedback. For example, a group of synchronized dancers may benefit from monitoring their dances with the sensors. A dancer may receive haptic feedback suggesting that the dancer is "leading" or "following," or may receive information about trends. The dancer may thus be alerted that the dancer should slow down or speed up the pace or tempo to be in sync with the other dancers. Other forms of synchronized activities may also benefit from using sensors to monitor activity of two or more people, such as ballroom dancing, synchronized swimming/diving, pedaling on a two-person bicycle, or the like. Haptic feedback may be used to indicate, in examples such as ballroom dancing, that a beat is starting. This may allow a user to keep a beat more accurately by relying on the haptic feedback instead of a personal understanding of rhythm.

Figure 6:
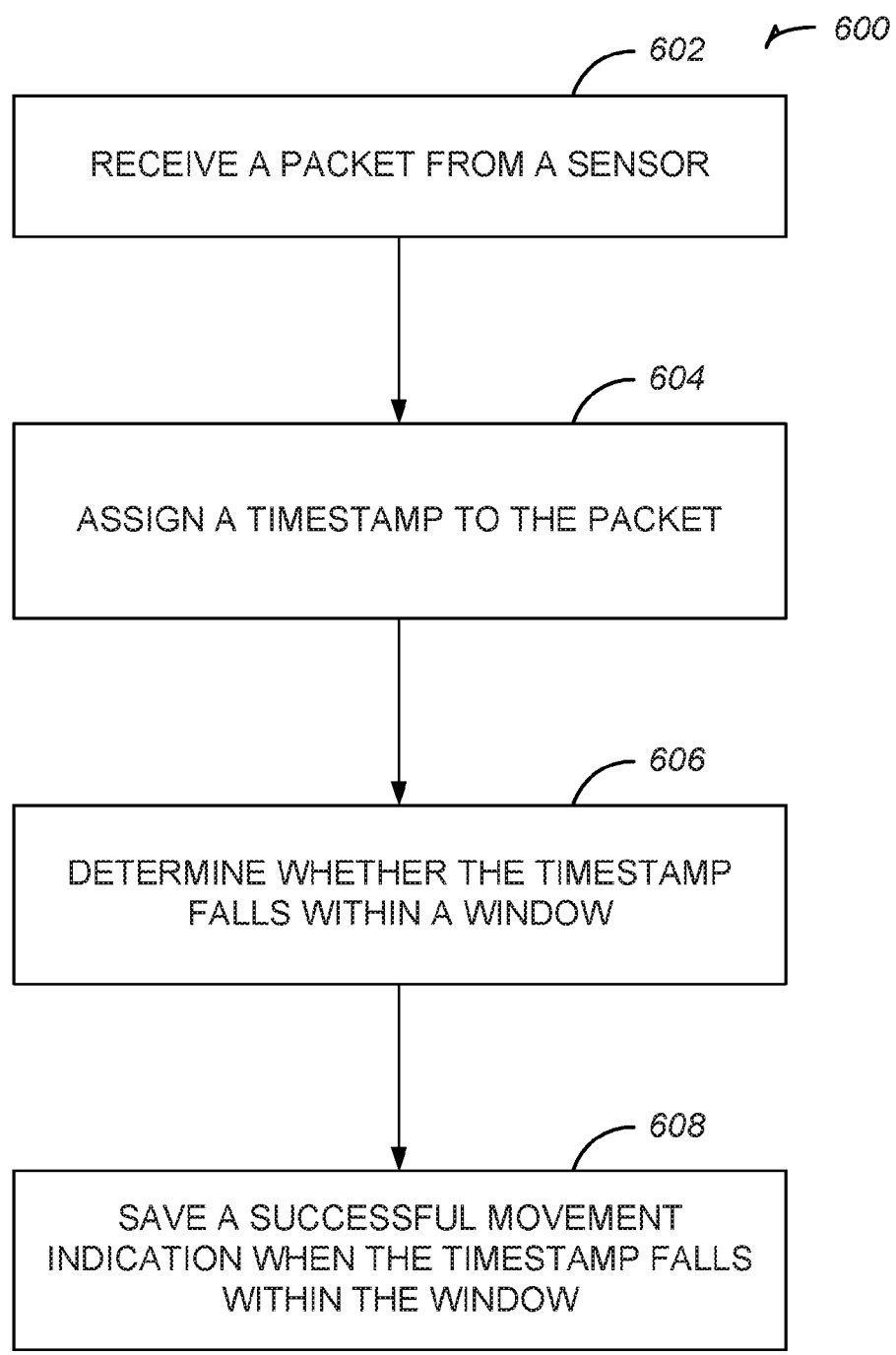
FIG. 6 illustrates generally a flowchart showing a method for using a sensor to determine timed movement in accordance with some embodiments.

FIG. 6 illustrates generally a flowchart showing a method 600 for using a sensor to determine timed movement in accordance with some embodiments. The method 600 may include an operation 602 to receive a packet from a sensor. The sensor may include an accelerometer and the packet may include a force measurement. The packet may be received over a wireless connection. The sensor may be attached to footwear of a user.

The method 600 may include an operation 604 to assign a timestamp to the packet. The method 600 may include an operation 606 to determine whether the timestamp falls within a window. The window may correspond to an error range around a sensory output (i.e., a time that an output occurs), such as a visual output, an audio output, or both.

The method 600 may include an operation 608 to save a successful movement indication when the timestamp falls within the window. Operation 608 may include first determining that the packet timestamp falls within the window, includes sensor data indicating the sensor achieved a force that exceeds a minimum force, or both. The method 600 may include operations to, in response to saving the successful movement indication, display an output, play a tone or music, vibrate the sensor, or the like. The successful movement indication may be displayed on a user interface.

Figure 7:
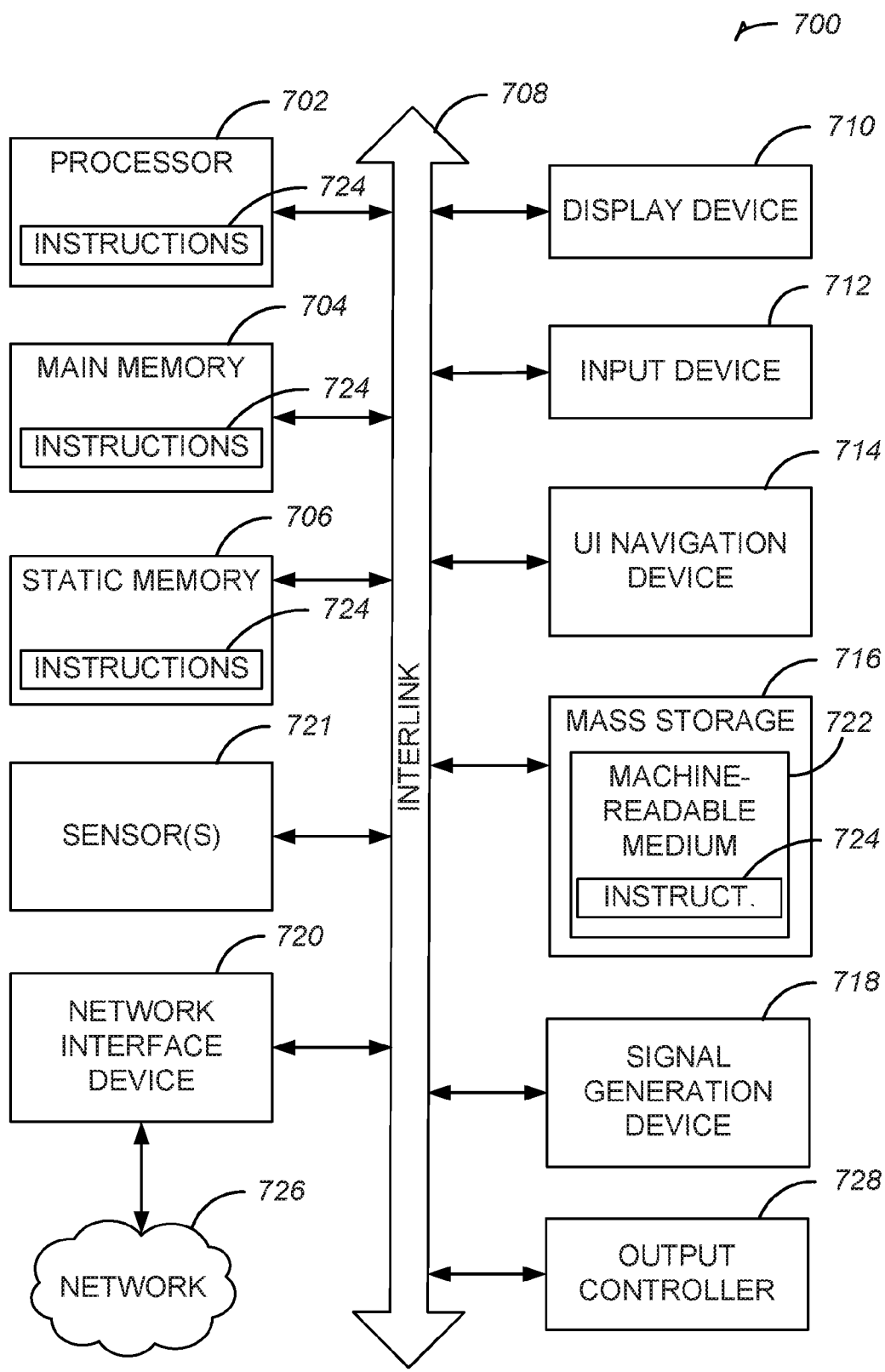
FIG. 7 illustrates generally an example of a block diagram of a machine upon which any one or more of the techniques (e.g., methodologies) discussed herein may perform in accordance with some embodiments.

FIG. 7 illustrates generally an example of a block diagram of a machine 700 upon which any one or more of the techniques (e.g., methodologies) discussed herein may perform in accordance with some embodiments. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708.

The machine 700 may further include a display unit 710, an alphanumeric input device 712 (e.g., a keyboard), and a user interface (UI) navigation device 714 (e.g., a mouse). In an example, the display unit 710, alphanumeric input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 that is non-transitory on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Figure 8:
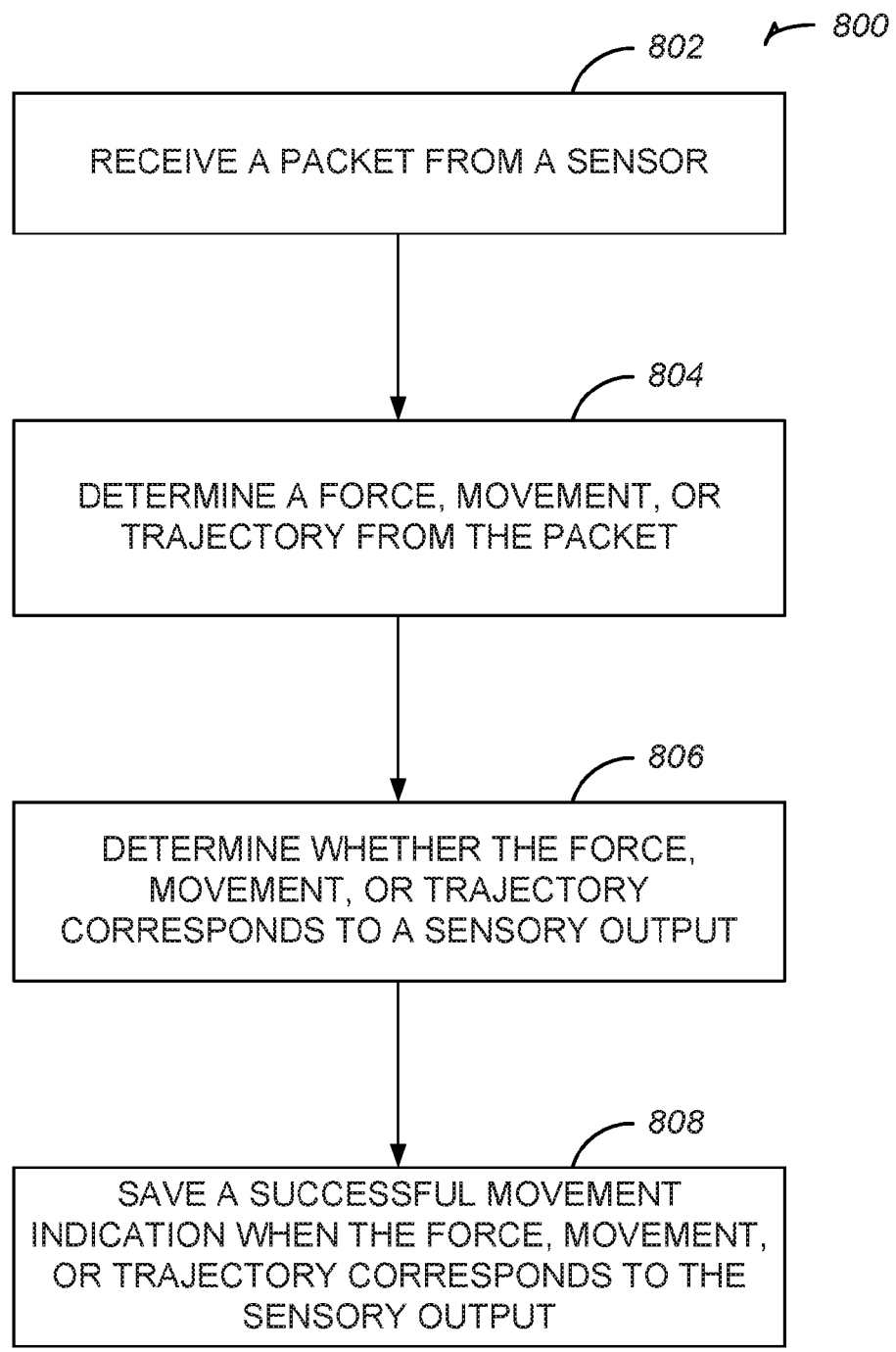
FIG. 8 illustrates generally a flowchart showing a method for using a sensor to determine movement or trajectory in accordance with some embodiments.

FIG. 8 illustrates generally a flowchart showing a method 800 for using a sensor to determine movement or trajectory in accordance with some embodiments. The method 800 may include an operation 802 to receive a packet from a sensor. The sensor may include an accelerometer. The packet may be received over a wireless connection. The sensor may be attached to footwear of a user.

The method 800 may include an operation 804 to determine a force, movement, or trajectory of the sensor from the packet. Operation 804 may include determining the force, movement, or trajectory from sensor data, including from a plurality of packets. In another example, the packet may include information about a plurality of sensor measurements.

The method 800 may include an operation 806 to determine whether the force, movement, or trajectory corresponds to a sensory output. The sensory output may include an error range. In an example, the sensory output may include a visual output, an audio output, or both.

The method 800 may include an operation 808 to save a successful movement indication when the force movement, or trajectory corresponds to the sensory output. Operation 808 may include first determining that the packet timestamp falls within the window, includes sensor data indicating the sensor achieved a force that exceeds a minimum force, or both. The method 800 may include operations to, in response to saving the successful movement indication, display an output, play a tone or music, vibrate the sensor, or the like. The successful movement indication may be displayed on a user interface. In another example, the force may indicate that the sensor is not moving or was not moved for a period of time (e.g., a yoga pose). For example, the sensor may include an accelerometer that may measure a constant or nearly constant gravitational force without other forces exerted on the sensor.

VARIOUS NOTES & EXAMPLES

Each of these non-limiting examples may stand on its own, or may be combined in various permutations or combinations with one or more of the other examples.

In Example 1 is a control device comprising: a transceiver to: receive sensor data from a sensor; and assign a timestamp to the sensor data; a processor to: determine whether the timestamp falls within a window, the window corresponding to an error range around a sensory output; and save, in response to determining that the timestamp falls within the window, a successful movement indication to a database.

In Example 2, the subject matter of Example 1 optionally includes, wherein the sensor includes an accelerometer.

In Example 3, the subject matter of Example 2 optionally includes, wherein the sensor data includes a force measurement.

In Example 4, the subject matter of Example 3 optionally includes, wherein to save the successful movement indication includes the processor to first determine whether the force measurement exceeds a minimum force.

In Example 5, the subject matter of any one or more of Examples 1-4 optionally include, further comprising a display that includes a user interface to display the successful movement indication.

In Example 6, the subject matter of Example 5 optionally includes, wherein the processor is to increment a count of points for a user in a game displayed on the user interface based on the successful movement indication.

In Example 7, the subject matter of any one or more of Examples 1-6 optionally include, wherein to receive the sensor data, the transceiver is to receive the sensor data over a wireless connection.

In Example 8, the subject matter of any one or more of Examples 1-7 optionally include, wherein the sensor is attached to footwear of a user.

In Example 9, the subject matter of any one or more of Examples 1-8 optionally include, wherein the processor is to play a tone in response to saving the successful movement indication.

In Example 10, the subject matter of any one or more of Examples 1-9 optionally include, wherein the error range is plus or minus 100 milliseconds.

In Example 11, the subject matter of any one or more of Examples 1-10 optionally include, wherein the sensory output includes an audio or visual output.

In Example 12, the subject matter of Example 11 optionally includes, wherein the audio output includes music, and wherein to determine whether the timestamp falls within the window, the processor is to determine that the sensor data is synchronized with the music.

In Example 13, the subject matter of any one or more of Examples 11-12 optionally include, wherein the visual output includes video and wherein to determine whether the timestamp falls within the window, the processor is to determine that the sensor data is synchronized with the video.

In Example 14, the subject matter of any one or more of Examples 1-13 optionally include, wherein the transceiver is to send, in response to determining that the timestamp falls outside the window, a signal to the sensor indicating feedback to be performed at the sensor.

In Example 15, the subject matter of Example 14 optionally includes, wherein the feedback includes haptic feedback, light feedback, or audio feedback.

In Example 16, the subject matter of any one or more of Examples 1-15 optionally include, wherein the control device is a mobile device.

In Example 17, the subject matter of any one or more of Examples 1-16 optionally include, wherein the sensor is attached to an ankle bracelet.

Example 18 is at least one machine readable medium including instructions that, when executed, cause the machine to perform operations for dynamic hardware acceleration, the operations comprising: receiving sensor data from a sensor; assigning a timestamp to the sensor data; determining whether the timestamp falls within a window, the window corresponding to an error range around a sensory output; and saving, in response to determining that the packet timestamp falls within the window, a successful movement indication to a database.

In Example 19, the subject matter of Example 18 optionally includes, wherein the sensor includes an accelerometer.

In Example 20, the subject matter of Example 19 optionally includes, wherein the sensor data includes a force measurement.

In Example 21, the subject matter of Example 20 optionally includes, wherein saving the successful movement indication includes first determining whether the force measurement exceeds a minimum force.

In Example 22, the subject matter of any one or more of Examples 18-21 optionally include, further comprising displaying the successful movement indication on a user interface.

In Example 23, the subject matter of Example 22 optionally includes, further comprising incrementing a count of points for a user in a game displayed on the user interface based on the successful movement indication.

In Example 24, the subject matter of any one or more of Examples 18-23 optionally include, wherein receiving the sensor data includes receiving the sensor data over a wireless connection.

In Example 25, the subject matter of any one or more of Examples 18-24 optionally include, wherein the sensor is attached to footwear of a user.

In Example 26, the subject matter of any one or more of Examples 18-25 optionally include, further comprising playing a tone in response to saving the successful movement indication.

In Example 27, the subject matter of any one or more of Examples 18-26 optionally include, wherein the error range is plus or minus 100 milliseconds.

In Example 28, the subject matter of any one or more of Examples 18-27 optionally include, wherein the sensory output includes an audio or visual output.

In Example 29, the subject matter of any one or more of Examples 18-28 optionally include, further comprising sending, in response to determining that the timestamp falls outside the window, a signal to the sensor indicating feedback to be performed at the sensor.

In Example 30, the subject matter of Example 29 optionally includes, wherein the feedback includes haptic feedback, light feedback, or audio feedback.

Example 31 is a method for using a sensor to determine movement, the method comprising: receiving sensor data from the sensor; assigning a timestamp to the sensor data; determining whether the timestamp falls within a window, the window corresponding to an error range around a sensory output; and saving, in response to determining that the timestamp falls within the window, a successful movement indication to a database.

In Example 32, the subject matter of Example 31 optionally includes, wherein the sensor includes an accelerometer.

In Example 33, the subject matter of Example 32 optionally includes, wherein the sensor data includes a force measurement.

In Example 34, the subject matter of Example 33 optionally includes, wherein saving the successful movement indication includes first determining whether the force measurement exceeds a minimum force.

In Example 35, the subject matter of any one or more of Examples 31-34 optionally include, further comprising displaying the successful movement indication on a user interface.

In Example 36, the subject matter of Example 35 optionally includes, further comprising incrementing a count of points for a user in a game displayed on the user interface based on the successful movement indication.

In Example 37, the subject matter of any one or more of Examples 31-36 optionally include, wherein receiving the sensor data includes receiving the sensor data over a wireless connection.

In Example 38, the subject matter of any one or more of Examples 31-37 optionally include, wherein the sensor is attached to footwear of a user.

In Example 39, the subject matter of any one or more of Examples 31-38 optionally include, further comprising playing a tone in response to saving the successful movement indication.

In Example 40, the subject matter of any one or more of Examples 31-39 optionally include, wherein the error range is plus or minus 100 milliseconds.

In Example 41, the subject matter of any one or more of Examples 31-40 optionally include, wherein the sensory output includes an audio or visual output.

In Example 42, the subject matter of any one or more of Examples 31-41 optionally include, further comprising sending, in response to determining that the timestamp falls outside the window, a signal to the sensor indicating feedback to be performed at the sensor.

In Example 43, the subject matter of Example 42 optionally includes, wherein the feedback includes haptic feedback, light feedback, or audio feedback.

Example 44 is a device configured to move with to footwear, the device comprising: an accelerometer to measure a force; a transceiver to: send information about the force to an external device; and receive a response from the external device, the response indicating whether the force exceeded a threshold and occurred within a specified timing window around a sensory output; and feedback hardware to generate feedback when the response indicates that the force fell below the threshold or occurred outside the specified timing window.

In Example 45, the subject matter of Example 44 optionally includes, wherein when the response indicates that the force exceeded the threshold and occurred within the specified timing window, the transceiver is to receive an indication of points awarded to a user of the footwear in a game.

In Example 46, the subject matter of any one or more of Examples 44-45 optionally include, wherein when the response indicates that the force exceeded the threshold and occurred within the specified timing window, the feedback hardware is to play a tone, generate haptic feedback, or display light.

In Example 47, the subject matter of any one or more of Examples 44-46 optionally include, wherein to send the information, the transceiver is to send the information over a wireless connection with the external device.

In Example 48, the subject matter of any one or more of Examples 44-47 optionally include, wherein the specified timing window is plus or minus 100 milliseconds around the sensory output.

In Example 49, the subject matter of any one or more of Examples 44-48 optionally include, wherein the sensory output includes an audio or visual output.

In Example 50, the subject matter of any one or more of Examples 44-49 optionally include, wherein to generate feedback, the feedback hardware is to play a tone, generate haptic feedback, or display light.

In Example 51, the subject matter of any one or more of Examples 44-50 optionally include, wherein before the transceiver sends information about the force, the transceiver is to send an initialization indication to the external device, the initialization indication sent in response to the accelerometer determining a lack of movement for a predetermined period of time.

Example 52 is a method for using a sensor configured to move with to footwear, the method comprising: measuring a force using the sensor; sending information about the force to an external device; receiving a response from the external device, the response indicating whether the force exceeded a threshold and occurred within a specified timing window around a sensory output; and generating feedback when the response indicates that the force fell below the threshold or occurred outside the specified timing window.

In Example 53, the subject matter of Example 52 optionally includes, further comprising, when the response indicates that the force exceeded the threshold and occurred within the specified timing window, receiving an indication of points awarded to a user of the footwear in a game.

In Example 54, the subject matter of any one or more of Examples 52-53 optionally include, further comprising, when the response indicates that the force exceeded the threshold and occurred within the specified timing window, playing a tone, generating haptic feedback, or displaying light.

In Example 55, the subject matter of any one or more of Examples 52-54 optionally include, wherein sending information includes sending information over a wireless connection with the external device.

In Example 56, the subject matter of any one or more of Examples 52-55 optionally include, wherein the specified timing window is plus or minus 100 milliseconds around the sensory output.

In Example 57, the subject matter of any one or more of Examples 52-56 optionally include, wherein the sensory output includes an audio or visual output.

In Example 58, the subject matter of any one or more of Examples 52-57 optionally include, wherein generating feedback includes playing a tone, generating haptic feedback, or displaying light.

In Example 59, the subject matter of any one or more of Examples 52-58 optionally include, further comprising: determining a lack of movement at the sensor for a predetermined period of time; and before sending information about the force, sending an initialization indication to the external device, the initialization indication sent in response to determining the lack of movement.

In Example 60, the subject matter of any one or more of Examples 52-59 optionally include, wherein the sensor is an accelerometer.

Example 61 is at least one machine readable medium including instructions that, when executed, cause the machine to perform operations for dynamic hardware acceleration, the operations comprising: measuring a force using the sensor; sending information about the force to an external device; receiving a response from the external device, the response indicating whether the force exceeded a threshold and occurred within a specified timing window around a sensory output; and generating feedback when the response indicates that the force fell below the threshold or occurred outside the specified timing window.

In Example 62, the subject matter of Example 61 optionally includes, further comprising, when the response indicates that the force exceeded the threshold and occurred within the specified timing window, receiving an indication of points awarded to a user of the footwear in a game.

In Example 63, the subject matter of any one or more of Examples 61-62 optionally include, further comprising, when the response indicates that the force exceeded the threshold and occurred within the specified timing window, playing a tone, generating haptic feedback, or displaying light.

In Example 64, the subject matter of any one or more of Examples 61-63 optionally include, wherein sending information includes sending information over a wireless connection with the external device.

In Example 65, the subject matter of any one or more of Examples 61-64 optionally include, wherein the specified timing window is plus or minus 100 milliseconds around the sensory output.

In Example 66, the subject matter of any one or more of Examples 61-65 optionally include, wherein the sensory output includes an audio or visual output.

In Example 67, the subject matter of any one or more of Examples 61-66 optionally include, wherein generating feedback includes playing a tone, generating haptic feedback, or displaying light.

In Example 68, the subject matter of any one or more of Examples 61-67 optionally include, further comprising: determining a lack of movement at the sensor for a predetermined period of time; and before sending information about the force, sending an initialization indication to the external device, the initialization indication sent in response to determining the lack of movement.

In Example 69, the subject matter of any one or more of Examples 61-68 optionally include, wherein the sensor is an accelerometer.

Example 70 is at least one machine-readable medium including instructions for operation of a computing system, which when executed by a machine, cause the machine to perform operations of any of the methods of Examples 31-43.

Example 71 is an apparatus comprising means for performing any of the methods of Examples 31-43.

Example 72 is at least one machine-readable medium including instructions for operation of a computing system, which when executed by a machine, cause the machine to perform operations of any of the methods of Examples 52-60.

Example 73 is an apparatus comprising means for performing any of the methods of Examples 52-60.

Example 74 is an apparatus comprising: means for receiving sensor data from a sensor; means for assigning a timestamp to the sensor data; means for determining whether the timestamp falls within a window, the window corresponding to an error range around a sensory output; and means for saving, in response to determining that the timestamp falls within the window, a successful movement indication to a database.

In Example 75, the subject matter of Example 74 optionally includes, wherein the sensor includes an accelerometer.

In Example 76, the subject matter of Example 75 optionally includes, wherein the sensor data includes a force measurement.

In Example 77, the subject matter of Example 76 optionally includes, wherein the means for saving the successful movement indication include means for first determining whether the force measurement exceeds a minimum force.

In Example 78, the subject matter of any one or more of Examples 74-77 optionally include, further comprising means for displaying the successful movement indication on a user interface.

In Example 79, the subject matter of Example 78 optionally includes, further comprising means for incrementing a count of points for a user in a game displayed on the user interface based on the successful movement indication.

In Example 80, the subject matter of any one or more of Examples 74-79 optionally include, wherein the means for receiving the sensor data include means for receiving the sensor data over a wireless connection.

In Example 81, the subject matter of any one or more of Examples 74-80 optionally include, wherein the sensor is attached to footwear of a user.

In Example 82, the subject matter of any one or more of Examples 74-81 optionally include, further comprising means for playing a tone in response to saving the successful movement indication.

In Example 83, the subject matter of any one or more of Examples 74-82 optionally include, wherein the error range is plus or minus 100 milliseconds.

In Example 84, the subject matter of any one or more of Examples 74-83 optionally include, wherein the sensory output includes an audio or visual output.

In Example 85, the subject matter of any one or more of Examples 74-84 optionally include, further comprising means for sending, in response to determining that the timestamp falls outside the window, a signal to the sensor indicating feedback to be performed at the sensor.

In Example 86, the subject matter of Example 85 optionally includes, wherein the feedback includes haptic feedback, light feedback, or audio feedback.

Example 87 is an apparatus comprising: means for measuring a force using the sensor; means for sending information about the force to an external device; means for receiving a response from the external device, the response indicating whether the force exceeded a threshold and occurred within a specified timing window around a sensory output; and means for generating feedback when the response indicates that the force fell below the threshold or occurred outside the specified timing window.

In Example 88, the subject matter of Example 87 optionally includes, further comprising, when the response indicates that the force exceeded the threshold and occurred within the specified timing window, means for receiving an indication of points awarded to a user of the footwear in a game.

In Example 89, the subject matter of any one or more of Examples 87-88 optionally include, further comprising, when the response indicates that the force exceeded the threshold and occurred within the specified timing window, means for playing a tone, means for generating haptic feedback, or means for displaying light.

In Example 90, the subject matter of any one or more of Examples 87-89 optionally include, wherein the means for sending information include means for sending information over a wireless connection with the external device.

In Example 91, the subject matter of any one or more of Examples 87-90 optionally include, wherein the specified timing window is plus or minus 100 milliseconds around the sensory output.

In Example 92, the subject matter of any one or more of Examples 87-91 optionally include, wherein the sensory output includes an audio or visual output.

In Example 93, the subject matter of any one or more of Examples 87-92 optionally include, wherein the means for generating feedback include means for playing a tone, means for generating haptic feedback, or means for displaying light.

In Example 94, the subject matter of any one or more of Examples 87-93 optionally include, further comprising: means for determining a lack of movement at the sensor for a predetermined period of time; and before sending information about the force, means for sending an initialization indication to the external device, the initialization indication sent in response to determining the lack of movement.

In Example 95, the subject matter of any one or more of Examples 87-94 optionally include, wherein the sensor is an accelerometer.

Example 96 is at least one machine readable medium including instructions that, when executed, cause the machine to perform operations for dynamic hardware acceleration, the operations comprising: receiving sensor data from a plurality of sensors; assigning a plurality of timestamps to the sensor data; determining whether the plurality of timestamps fall within a window, the window corresponding to an error range around a sensory output; and in response to determining that a first timestamp of the plurality of timestamps falls within the window, saving a first indication to a database.

In Example 97, the subject matter of Example 96 optionally includes, wherein in response to determining a set of timestamps of the plurality of timestamps fall within the window, playing a plurality of instrument lines of a song, wherein the plurality of instrument lines correspond to the set of timestamps.

In Example 98, the subject matter of any one or more of Examples 96-97 optionally include, wherein the plurality of packets include force information from the plurality of sensors.

In Example 99, the subject matter of Example 98 optionally includes, wherein in response to saving the first indication, increasing or decreasing a speed of a virtual vehicle on a user interface in response to an increase or decrease in force at a first sensor, the first sensor corresponding to the first timestamp.

In Example 100, the subject matter of any one or more of Examples 96-99 optionally include, further comprising determining that the plurality of timestamps are synchronized, and in response, playing music.

In Example 101, the subject matter of any one or more of Examples 96-100 optionally include, wherein the sensory output includes an nth beat of a song.

In Example 102, the subject matter of any one or more of Examples 96-101 optionally include, further comprising displaying results of whether the plurality of timestamps fall within the window on a user interface.

In Example 103, the subject matter of any one or more of Examples 96-102 optionally include, further comprising assigning points in a virtual game to users of the plurality of sensors according to temporal proximity of the plurality of timestamps to the sensory output.

Example 104 is a method for determining time synchronization, the method comprising: receiving, at a server, an indication from a sensor of a first wearable device; determining whether the first wearable device is time synchronized with a second wearable device using the indication; and saving, in response to determining that the first wearable device is synchronized with the second wearable device, a successful time synchronization message to a database.

In Example 105, the subject matter of Example 104 optionally includes, wherein determining whether the first wearable device is time synchronized with a second wearable device includes determining whether a first timestamp corresponding to the indication is synchronized with a second timestamp corresponding to a second indication received form the second wearable device.

In Example 106, the subject matter of any one or more of Examples 104-105 optionally include, further comprising using the indication to control a virtual pedal on a virtual car.

In Example 107, the subject matter of Example 106 optionally includes, wherein the indication includes a force measurement.

In Example 108, the subject matter of any one or more of Examples 104-107 optionally include, further comprising updating a scoreboard in response to determining that the first wearable device is synchronized with the second wearable device.

Example 109 is a method for determining music synchronization, the method comprising: receiving, at a server, an indication from a sensor of a first wearable device; determining whether the first wearable device is synchronized with music being played; and saving, in response to determining that the first wearable device is synchronized with the music, a successful music synchronization message to a database.

In Example 110, the subject matter of Example 109 optionally includes, wherein determining whether the first wearable device is synchronized with the music includes determining whether a first timestamp corresponding to the indication is synchronized with a second timestamp corresponding to the music.

In Example 111, the subject matter of any one or more of Examples 109-110 optionally include, wherein the indication includes a force measurement.

In Example 112, the subject matter of any one or more of Examples 109-111 optionally include, further comprising changing volume of the music in response to receiving the indication.

In Example 113, the subject matter of any one or more of Examples 109-112 optionally include, further comprising updating a scoreboard in response to determining that the first wearable device is synchronized with the music.

Example 114 is a method for determining video synchronization, the method comprising: receiving, at a server, an indication from a sensor of a first wearable device; determining whether the first wearable device is synchronized with video being played; and saving, in response to determining that the first wearable device is synchronized with the video, a successful video synchronization message to a database.

In Example 115, the subject matter of Example 114 optionally includes, wherein determining whether the first wearable device is synchronized with the video includes determining whether a first timestamp corresponding to the indication is synchronized with a second timestamp corresponding to the video.

In Example 116, the subject matter of any one or more of Examples 114-115 optionally include, wherein the indication includes a force measurement.

In Example 117, the subject matter of any one or more of Examples 114-116 optionally include, further comprising updating a scoreboard in response to determining that the first wearable device is synchronized with the video.

Example 118 is a control device comprising: a transceiver to: receive an indication from a sensor of a first wearable device; and a processor to: determine whether the first wearable device is time synchronized with a second wearable device using the indication; and save in response to determining that the first wearable device is synchronized with the second wearable device, a successful time synchronization message to a database.

In Example 119, the subject matter of Example 118 optionally includes, wherein to determine whether the first wearable device is time synchronized with a second wearable device, the processor is to determine whether a first timestamp corresponding to the indication is synchronized with a second timestamp corresponding to a second indication received form the second wearable device.

In Example 120, the subject matter of any one or more of Examples 118-119 optionally include, wherein the processor is further to use the indication to control a virtual pedal on a virtual car.

In Example 121, the subject matter of Example 120 optionally includes, wherein the indication includes a force measurement.

In Example 122, the subject matter of any one or more of Examples 118-121 optionally include, wherein the processor is further to update a scoreboard in response to determining that the first wearable device is synchronized with the second wearable device.

Example 123 is a control device comprising: a transceiver to: receive, at a server, an indication from a sensor of a first wearable device; and a processor to: determine whether the first wearable device is synchronized with music being played; and save, in response to determining that the first wearable device is synchronized with the music, a successful music synchronization message to a database.

In Example 124, the subject matter of Example 123 optionally includes, wherein to determine whether the first wearable device is synchronized with the music, the processor is to determine whether a first timestamp corresponding to the indication is synchronized with a second timestamp corresponding to the music.

In Example 125, the subject matter of any one or more of Examples 123-124 optionally include, wherein the indication includes a force measurement.

In Example 126, the subject matter of any one or more of Examples 123-125 optionally include, wherein the processor is to change volume of the music in response to receiving the indication.

In Example 127, the subject matter of any one or more of Examples 123-126 optionally include, wherein the processor is to update a scoreboard in response to determining that the first wearable device is synchronized with the music.

Example 128 is a control device comprising: a transceiver to: receive, at a server, an indication from a sensor of a first wearable device; and a processor to: determine whether the first wearable device is synchronized with video being played; and save, in response to determining that the first wearable device is synchronized with the video, a successful video synchronization message to a database.

In Example 129, the subject matter of Example 128 optionally includes, wherein to determine whether the first wearable device is synchronized with the video, the processor is to determine whether a first timestamp corresponding to the indication is synchronized with a second timestamp corresponding to the video.

In Example 130, the subject matter of any one or more of Examples 128-129 optionally include, wherein the indication includes a force measurement.

In Example 131, the subject matter of any one or more of Examples 128-130 optionally include, wherein the processor is to update a scoreboard in response to determining that the first wearable device is synchronized with the video.

Example 132 is at least one machine readable medium including instructions that, when executed, cause the machine to perform operations for dynamic hardware acceleration, the operations comprising: receiving, at a server, an indication from a sensor of a first wearable device; determining whether the first wearable device is time synchronized with a second wearable device using the indication; and saving, in response to determining that the first wearable device is synchronized with the second wearable device, a successful time synchronization message to a database.

In Example 133, the subject matter of Example 132 optionally includes, wherein determining whether the first wearable device is time synchronized with a second wearable device includes determining whether a first timestamp corresponding to the indication is synchronized with a second timestamp corresponding to a second indication received form the second wearable device.

In Example 134, the subject matter of any one or more of Examples 132-133 optionally include, further comprising using the indication to control a virtual pedal on a virtual car.

In Example 135, the subject matter of Example 134 optionally includes, wherein the indication includes a force measurement.

In Example 136, the subject matter of any one or more of Examples 132-135 optionally include, further comprising updating a scoreboard in response to determining that the first wearable device is synchronized with the second wearable device.

Example 137 is at least one machine readable medium including instructions that, when executed, cause the machine to perform operations for dynamic hardware acceleration, the operations comprising: receiving, at a server, an indication from a sensor of a first wearable device; determining whether the first wearable device is synchronized with music being played; and saving, in response to determining that the first wearable device is synchronized with the music, a successful music synchronization message to a database.

In Example 138, the subject matter of Example 137 optionally includes, wherein determining whether the first wearable device is synchronized with the music includes determining whether a first timestamp corresponding to the indication is synchronized with a second timestamp corresponding to the music.

In Example 139, the subject matter of any one or more of Examples 137-138 optionally include, wherein the indication includes a force measurement.

In Example 140, the subject matter of any one or more of Examples 137-139 optionally include, further comprising changing volume of the music in response to receiving the indication.

In Example 141, the subject matter of any one or more of Examples 137-140 optionally include, further comprising updating a scoreboard in response to determining that the first wearable device is synchronized with the music.

Example 142 is at least one machine readable medium including instructions that, when executed, cause the machine to perform operations for dynamic hardware acceleration, the operations comprising: receiving, at a server, an indication from a sensor of a first wearable device; determining whether the first wearable device is synchronized with video being played; and saving, in response to determining that the first wearable device is synchronized with the video, a successful video synchronization message to a database.

In Example 143, the subject matter of Example 142 optionally includes, wherein determining whether the first wearable device is synchronized with the video includes determining whether a first timestamp corresponding to the indication is synchronized with a second timestamp corresponding to the video.

In Example 144, the subject matter of any one or more of Examples 142-143 optionally include, wherein the indication includes a force measurement.

In Example 145, the subject matter of any one or more of Examples 142-144 optionally include, further comprising updating a scoreboard in response to determining that the first wearable device is synchronized with the video.

Example 146 is an apparatus for determining time synchronization, the apparatus comprising: means for receiving, at a server, an indication from a sensor of a first wearable device; means for determining whether the first wearable device is time synchronized with a second wearable device using the indication; and means for saving, in response to determining that the first wearable device is synchronized with the second wearable device, a successful time synchronization message to a database.

In Example 147, the subject matter of Example 146 optionally includes, wherein the means for determining whether the first wearable device is time synchronized with a second wearable device include means for determining whether a first timestamp corresponding to the indication is synchronized with a second timestamp corresponding to a second indication received form the second wearable device.

In Example 148, the subject matter of any one or more of Examples 146-147 optionally include, further comprising means for using the indication to control a virtual pedal on a virtual car.

In Example 149, the subject matter of Example 148 optionally includes, wherein the indication includes a force measurement.

In Example 150, the subject matter of any one or more of Examples 146-149 optionally include, further comprising means for updating a scoreboard in response to determining that the first wearable device is synchronized with the second wearable device.

Example 151 is an apparatus for determining music synchronization, the apparatus comprising: means for receiving, at a server, an indication from a sensor of a first wearable device; means for determining whether the first wearable device is synchronized with music being played; and means for saving, in response to determining that the first wearable device is synchronized with the music, a successful music synchronization message to a database.

In Example 152, the subject matter of Example 151 optionally includes, wherein the means for determining whether the first wearable device is synchronized with the music include means for determining whether a first timestamp corresponding to the indication is synchronized with a second timestamp corresponding to the music.

In Example 153, the subject matter of any one or more of Examples 151-152 optionally include, wherein the indication includes a force measurement.

In Example 154, the subject matter of any one or more of Examples 151-153 optionally include, further comprising means for changing volume of the music in response to receiving the indication.

In Example 155, the subject matter of any one or more of Examples 151-154 optionally include, further comprising means for updating a scoreboard in response to determining that the first wearable device is synchronized with the music.

Example 156 is an apparatus for determining video synchronization, the apparatus comprising: means for receiving, at a server, an indication from a sensor of a first wearable device; means for determining whether the first wearable device is synchronized with video being played; and means for saving, in response to determining that the first wearable device is synchronized with the video, a successful video synchronization message to a database.

In Example 157, the subject matter of Example 156 optionally includes, wherein the means for determining whether the first wearable device is synchronized with the video include means for determining whether a first timestamp corresponding to the indication is synchronized with a second timestamp corresponding to the video.

In Example 158, the subject matter of any one or more of Examples 156-157 optionally include, wherein the indication includes a force measurement.

In Example 159, the subject matter of any one or more of Examples 156-158 optionally include, further comprising means for updating a scoreboard in response to determining that the first wearable device is synchronized with the video.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A control device operated by a user, the control device comprising:
    a transceiver to:
        receive sensor data from a sensor monitoring an activity of the user; and
        assign a timestamp to the sensor data;
    a processor to:
        identify a time that an audible or visual cue was presented to the user, the audible or visual cue being separate and distinct from the sensor data received by the transceiver;
        identity an error range for sensor data comparison, the error range adapted based on an age of the user;
        compare the timestamp of the sensor data to the time that the audible or visual cue was presented to the user, to determine whether the timestamp is within the error range; and
        save, in response to determining that the timestamp falls within the error range, a successful movement indication to a database.

2. The control device of claim 1, wherein the sensor includes an accelerometer.

3. The control device of claim 2, wherein the sensor data includes a force measurement.

4. The control device of claim 3, wherein to save the successful movement indication includes the processor to first determine whether the force measurement exceeds a minimum force.

5. The control device of claim 1, further comprising a display that includes a user interface to display the successful movement indication.

6. The control device of claim 5, wherein the processor is to increment a count of points for a user in a game displayed on the user interface based on the successful movement indication.

7. The control device of claim 1, wherein the sensor is attached to footwear or embedded in footwear of a user.

8. The control device of claim 1, wherein e sensor is attached to an ankle bracelet.

9. The control device of claim 1, wherein the processor is to play a tone in response to saving the successful movement indication.

10. The control device of claim 1, wherein the audio output includes music, and wherein to determine whether the timestamp falls within the error range, the processor is to determine that the sensor data is synchronized with the music.

11. The control device of claim 1, wherein the visual output includes video and wherein to determine whether the timestamp falls within the error range, the processor is to determine that the sensor data is synchronized with the video.

12. The control device of claim 1, wherein the transceiver is to send, in response to determining that the timestamp falls outside the error range, a signal to the sensor indicating feedback to be performed at the sensor.

13. The control device of claim 12, wherein the feedback includes haptic feedback, light feedback, or audio feedback.

14. A device configured to move with footwear worn by a user, the device comprising:
    an accelerometer to measure a force exerted by the user;
    a transceiver to:
        send information about the force to an external device; and
        receive a response from the external device, the external device configured to;
            identify a time that an audible or visual cue was presented to the user;
            identity an error range for sensor data comparison, the error range adapted based on an age of the user;
            compare a timestamp of when the force was measured by the accelerometer to the time that the audible or visual cue was presented to the user, to determine whether the timestamp is within the error range;
            identify a force threshold:
            compare the force measured by the accelerometer with the force threshold; and
            transmit the response to the transceiver, the response indicating whether the force exceeded the force threshold and occurred within the error range; and
    feedback hardware to generate feedback when the response indicates that the force fell below the force threshold or occurred outside the error range.

15. The device of claim 14, wherein when the response indicates that the force exceeded the force threshold and occurred within the error range, the transceiver is to receive an indication of points awarded to a user of the footwear in a game.

16. The device of claim 14, wherein when the response indicates that the force exceeded the force threshold and occurred within the error range, the feedback hardware is to play a tone, generate haptic feedback, or display light.

17. The device of claim 14, wherein before the transceiver sends information about the force, the transceiver is to send an initialization indication to the external device, the initialization indication sent in response to the accelerometer determining a lack of movement for a predetermined period of time.

18. At least one non-transitory machine readable medium including instructions that, when executed, cause the machine to perform operations, the operations comprising:
receiving sensor data from a plurality of sensors;
assigning a plurality of timestamps to the sensor data;
identifying a time that an audible or visual cue was presented to the user, the audible or visual cue being separate and distinct from the received sensor data;
identifying an error range for sensor data comparison, the error range adapted based on an age of the user;
comparing the plurality of timestamps of the sensor data to the time that the audible or visual cue was presented to the user, to determine whether the plurality of timestamps are within the error range; and
in response to determining that a frst timestamp of the plurality of timestamps falls within the error range, saving a first indication to a database.

19. The at least one non-transitory machine readable medium of claim 18, wherein in response to determining a set of timestamps of the plurality of timestamps fall within the error range, playing a plurality of instrument lines of a song, wherein the plurality of instrument lines correspond to the set of timestamps.

20. The at least one non-transitory machine readable medium of claim 18, wherein the sensor data includes force information from the plurality of sensors.

21. The at least one non-transitory machine readable medium of claim 20, wherein in response to saving the first indication, increasing or decreasing a speed of a virtual vehicle on a user interface in response to an increase or decrease in force at a first sensor, the first sensor corresponding to the first timestamp.

22. The at least one non-transitory machine readable medium of claim 18, further comprising determining that the plurality of timestamps are synchronized, and in response, playing music.

23. The at least one non-transitory machine readable medium of claim 18, wherein the audible or visual cue includes an nth beat of a song.

24. The at least one non-transitory machine readable medium of claim 18, further comprising displaying results of whether the plurality of timestamps fall within the window on a user interface.

25. The at least one non-transitory machine readable medium of claim 18, further comprising assigning points in a virtual game to users of the plurality of sensors according to temporal proximity of the plurality of timestamps to the audible or visual cue.

* * * * *

UNITED STATES PATENT AND TRADEMARK OFFICE
CERTIFICATE OF CORRECTION

PATENT NO. : 9,984,549 B2  
APPLICATION NO. : 14/968319  
DATED : May 29, 2018  
INVENTOR(S) : Poisner et al.

Page 1 of 1

It is certified that error appears in the above-identified patent and that said Letters Patent is hereby corrected as shown below:

On the Title Page

In item (*), in "Notice", in Column 1, Line 3, delete "days. days." and insert --days.-- therefor In the Claims In Column 23, Line 44, in Claim 1, delete "identity" and insert --identify-- therefor In Column 24, Line 3, in Claim 8, delete "e" and insert --the-- therefor In Column 24, Line 32, in Claim 14, delete "to;" and insert --to:-- therefor In Column 24, Line 35, in Claim 14, delete "identity" and insert --identify-- therefor In Column 24, Line 44, in Claim 14, delete "threshold:" and insert --threshold;-- therefor In Column 25, Line 7, in Claim 18, delete "user,the" and insert --user, the-- therefor In Column 25, Line 15, in Claim 18, delete "frst" and insert --first-- therefor Signed and Sealed this  
Twelfth Day of May, 2020

Andrei Iancu  
*Director of the United States Patent and Trademark Office*